US006416845B1

(12) United States Patent
Kume et al.

(10) Patent No.: US 6,416,845 B1
(45) Date of Patent: Jul. 9, 2002

(54) PRINTING SHEET AND PRINTED SHEET

(75) Inventors: Katsuya Kume; Katsuyuki Okazaki, both of Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 09/397,114

(22) Filed: Sep. 16, 1999

(30) Foreign Application Priority Data

Sep. 25, 1998 (JP) ........................................ 10-288864
Jan. 27, 1999 (JP) ........................................ 11-017996

(51) Int. Cl.[7] ........................................ B32B 7/12
(52) U.S. Cl. ........................................ 428/195
(58) Field of Search ........................................ 428/195, 913, 428/914

(56) References Cited

U.S. PATENT DOCUMENTS 5,578,365 A 11/1996 Kume et al.
5,763,356 A * 6/1998 Ueno et al. ................ 503/227
5,780,142 A * 7/1998 Kume et al. ................ 428/195
5,973,057 A * 10/1999 Schoeley et al. ........... 524/492
5,977,243 A * 11/1999 Barthel et al. ............. 524/588

FOREIGN PATENT DOCUMENTS

WO WO 93 07844 A 4/1993
WO WO 97 48086 A 12/1997

OTHER PUBLICATIONS

European Search Report.

* cited by examiner

*Primary Examiner*—Bruce H. Hess
*Assistant Examiner*—Michael Grendzynski
(74) *Attorney, Agent, or Firm*—Sughrue Mion, PLLC

(57) ABSTRACT

A printing sheet is disclosed from which burned sheets, such as, e.g., a management label effectively utilizable from the production of Braun tubes to the salvage thereof, which are excellent in chemical resistance, heat resistance, weatherability, hiding power or reflectance, etc., can be formed while satisfying advantages such as the bondability to curved surfaces which enables the printing sheet, after having been printed according to circumstances to impart information thereto, to be tightly bonded to adherends with heating, the suitability for expedient printed-sheet formation in which a variety of printed sheets necessary for the production of small quantities of many kinds of products can be formed therefrom in situ, etc. according to circumstances, and the ability to be easily and tightly bonded to adherends. The printing sheet (1) comprises a sheet made of a mixture comprising inorganic particles, an MQ resin, and a silicone rubber. Also disclosed is a printed sheet obtained by imparting ink information (2) to the printing sheet by thermal transfer printing.

10 Claims, 1 Drawing Sheet

PRINTING SHEET AND PRINTED SHEET

FIELD OF THE INVENTION

The present invention relates to a printing sheet excellent in hiding power or reflectance and suitable for use in forming management labels or the like. The present invention further relates to a printed sheet having excellent heat resistance obtained from the printing sheet through thermal transfer printing.

BACKGROUND OF THE INVENTION

Conventional printed sheets for use as management labels in Braun tube production processes include: a sheet which is obtained by printing a glass-based green sheet with an ink containing glass particles to impart ink information thereto and is to be baked by burning; and a sheet obtained by forming inorganic particles into a sheet with a polyorganosiloxane and imparting ink information to the sheet. (See JP-A-7-334088 (the term "JP-A" as used herein means an "unexamined published Japanese patent application"), Japanese Patent Application No. 8-228667, Japanese Patent 2,654,753, WO 93/07844, and U.S. Pat. No. 5,578,365.)

However, it has been found that those prior art management labels applied to Braun tubes or the like cannot be utilized up to the recycling step for reclaiming reworkable parts from these adherends. Specifically, in the case of Braun tubes, reworkable parts are reclaimed through a salvage step in which the panel is separated from the funnel by immersion in hot nitric acid. Upon this immersion, however, the ink information imparted to the management label applied to the Braun tube disappears, making it impossible to manage reworkable parts based on the management label.

SUMMARY OF THE INVENTION

An object of the present invention is to provide a printing sheet from which burned sheets, such as a management label effectively utilizable from the production of Braun tubes to the salvage thereof, which are excellent in chemical resistance, heat resistance, weatherability, hiding power or reflectance, etc., can be formed while satisfying advantages such as the bondability to curved surfaces which enables the printing sheet, after having been printed according to circumstances to impart information thereto, to be tightly bonded to adherends with heating, the suitability for expedient printed-sheet formation in which a variety of printed sheets necessary for the production of small quantities of many kinds of products can be formed therefrom in situ, etc. according to circumstances, and the ability to be easily and tightly bonded to adherends.

The present invention provides a printing sheet comprising a sheet made of a mixture comprising inorganic particles, an MQ resin, and a silicone rubber. The present invention further provides a printed sheet obtained by imparting ink information to the printing sheet by thermal transfer printing.

The printing sheet of the present invention is flexible and a variety of printed sheets can be formed therefrom according to circumstances by imparting ink information thereto by an appropriate printing technique, e.g., thermal transfer printing. These printed sheets can be satisfactorily adhered to, e.g., adherends having curved surfaces. Through a heat treatment, the printed sheets applied can be easily bonded tightly to the adherends to thereby form burned sheets satisfactorily retaining the imparted information. The burned sheets thus formed are excellent in chemical resistance, heat resistance, weatherability, hiding power or reflectance, etc., and can be effectively utilized as management labels or the like, for example, from the production of Braun tubes to the salvage thereof.

DESCRIPTION OF THE SYMBOLS

1: Printing sheet
- 11: Shape retention layer
- 12: Reinforcing substrate
- 13: Fine hole

2: Ink information layer

3: Pressure-sensitive adhesive layer
- 31: Layer of pressure-sensitive adhesive dots

4: Adherend

DETAILED DESCRIPTION OF THE INVENTION

Figure 1:
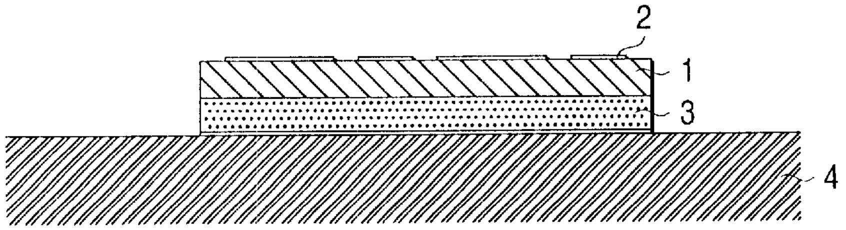
FIG. 1 is a sectional view of one embodiment of the printed sheet of the present invention.

The printing sheet of the present invention has a shape retention layer formed from a mixture comprising inorganic particles, an MQ resin, and a silicone rubber. The printed sheet is one obtained by imparting ink information to the shape retention layer by thermal transfer printing. An example of this printed sheet is shown in FIG. 1, wherein numeral 1 denotes a printing sheet, 2 ink information, 3 a pressure-sensitive adhesive layer disposed if desired, and 4 an adherend.

The printing sheet is not particularly limited as long as it comprises the shape retention layer in sheet form. The printing sheet can therefore have an appropriate constitution. Examples thereof include a constitution consisting of a shape retention layer alone (as in FIG. 1), a constitution comprising a shape retention layer 11 reinforced with a reinforcing substrate 12 as shown in FIG. 2, and a constitution having a pressure-sensitive adhesive layer.

Figure 2:
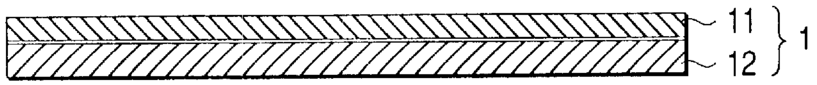
FIG. 2 is a sectional view of one embodiment of the printing sheet of the present invention.

The reinforced constitution may be formed by an appropriate method such as a method in which a shape retention layer is disposed on a reinforcing substrate as in FIG. 2, a method in which a reinforcing substrate is impregnated with a material for forming a shape retention layer, or a method in which a shape retention layer containing a reinforcing substrate disposed therein is formed. The reinforcing substrate may be an appropriate one. Examples thereof include coating layers of resins, resin films, fibers, fabrics, nonwoven fabrics, metal foils, and nets.

The reinforcing substrate may be made of a material which disappears upon heating, such as a polymer, e.g., a polyester, polyimide, fluororesin, or polyamide, or may be made of a material which does not disappear upon heating, such as a glass, ceramic, or metal.

The inorganic particles for use in forming the shape retention layer serve to improve heat resistance (generally up to about 500° C., preferably up to about 800° C.) and to determine the background color of printed sheets to be obtained from the printing sheet. Suitable inorganic particles can hence be used, such as metal particles or ceramic particles. One kind of inorganic particles or a combination of two or more kinds of inorganic particles can be used. Although the particle diameter of the inorganic particles is generally 50 μm or smaller, preferably from 0.05 to 20 μm, it is not limited thereto. To incorporate a flaky powder prepared by adhering inorganic particles to thin platy bases such as mica is effective in improving hiding power or reflectance.

Examples of inorganic particles generally used include white particles such as particles of silica, titania, alumina, zinc white, zirconia, calcium oxide, mica, potassium titanate, and aluminum borate. Examples thereof further include metal compounds, such as carbonates, nitrates, and sulfates, which are oxidized at temperatures not higher than the temperature to be used for the heat treatment of the printed sheet to thereby change into such oxide type white ceramics. Especially preferably used among these from the standpoints of whiteness, sinter strength, etc. are acicular crystals such as those of potassium titanate or aluminum borate.

Other examples of the inorganic particles include red particles such as manganese oxide-alumina, chromium oxide-tin oxide, iron oxide, and cadmium sulfide-selenium sulfide, blue particles such as cobalt oxide, zirconia-vanadium oxide, and chromium oxide-divanadium pentoxide, and black particles such as chromium oxide-cobalt oxide-iron oxide-manganese oxide, chromates, and permanganates.

Examples of the inorganic particles further include yellow particles such as zirconium-silicon-praseodymium, vanadium-tin, and chromium-titanium-antimony, green particles such as chromium oxide, cobalt-chromium, and alumina-chromium, and pink particles such as aluminum-manganese and iron-silicon-zirconium.

The MQ resin can comprise an appropriate polymer which is known as, e.g., a tackifier for silicone-based pressure-sensitive adhesives and comprises monofunctional units M represented by the general formula $R_3SiO—$ and tetrafunctional units Q represented by the formula $Si(O—)_4$. In the above general formula, each R may have an appropriate structural unit, for example, an organic group, e.g., an aliphatic hydrocarbon group such as methyl, ethyl, or propyl, an aromatic hydrocarbon group such as phenyl, or an olefin group such as vinyl, or a hydrolyzable group such as hydroxyl. A preferred MQ resin is one excellent in shape retention.

The silicone rubber also is not particularly limited and an appropriate one may be used. Various modified silicone rubbers are usable, such as phenol-modified, melamine-modified, epoxy-modified, polyester-modified, acrylic-modified, and urethane-modified silicone rubbers. A preferred silicone rubber is one excellent in shape retention and flexibility.

The printing sheet can be formed by, for example, the following method. Inorganic particles of one or more kinds are mixed with at least one MQ resin and at least one silicone rubber by means of a ball mill or the like using an organic solvent or the like if necessary. The resulting liquid mixture is spread by an appropriate technique, if desired, on a support such as a reinforcing substrate or separator, and the coating is dried to form the target sheet.

In forming the printing sheet, the proportion of the MQ resin and the silicone rubber to the inorganic particles can be suitably determined according to the handleability of the printing sheet, the strength and hiding power of printed sheets, etc. However, the sum of the resin and rubber is generally from 20 to 800 parts by weight, preferably from 30 to 500 parts by weight, more preferably from 100 to 300 parts by weight, per 100 parts by weight of the inorganic particles.

The proportion of the MQ resin to the silicone rubber can be suitably determined according to sinter strength, chemical resistance, etc. of the sheet. However, the silicone rubber is used in an amount of generally from 1 to 1,000 parts by weight, preferably from 3 to 500 parts by weight, more preferably from 5 to 200 parts by weight, per 100 parts by weight of the MQ resin If the MQ resin is incorporated in an insufficient amount, the sheet has a poor sinter strength. If the silicone rubber is incorporated in an insufficient amount, the sheet has poor resistance to chemicals such as hot nitric acid.

The organic solvent which can be used if desired may be an appropriate one. In general, use is made of toluene, xylene, butyl carbitol, ethyl acetate, butyl Cellosolve acetate, methyl ethyl ketone, methyl isobutyl ketone, or the like. Although the liquid mixture is not particularly limited, it is preferably prepared so as to have a solid concentration of from 5 to 85% by weight from the standpoints of spreadability, etc. In preparing the liquid mixture, appropriate additives can be incorporated, such as a dispersant, plasticizer, and combustion aid.

A preferred method for spreading is one having the excellent ability to regulate coating film thickness, such as the doctor blade method or gravure roll coater method. It is preferred to sufficiently defoam the liquid mixture, for example, by adding a defoamer so as to form a bubble-free spread layer. Although the thickness of the printing sheet or shape retention layer to be formed is suitably determined, it is generally from 5 μm to 5 mm, preferably from 10 μm to 1 mm, more preferably from 20 to 200 μm.

The printing sheet of the present invention can be made porous for the purpose of enabling decomposition gases resulting from heating to volatilize smoothly or for other purposes. There are cases where printed sheets swell due to decomposition gases resulting from heating especially when the printing sheet has a pressure-sensitive adhesive layer for provisional bonding. This swelling can be avoided by forming a porous printing sheet.

Figure 3:
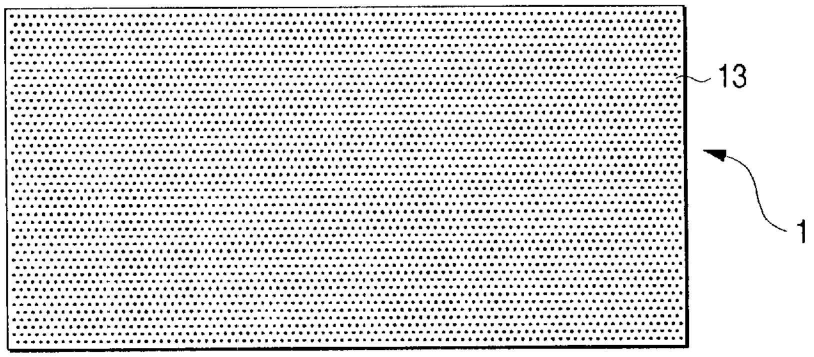
FIG. 3 is a plane view of another embodiment of the printing sheet of the present invention.

For forming a porous printing sheet, an appropriate method can be used, such as a method in which, as shown in FIG. 3, many fine holes 13 are formed in a printing sheet 1 by punching or the like or a method in which a woven fabric, a nonwoven fabric, a metal foil having many fine holes, a net, or the like is used as a reinforcing substrate.

An organic compound or other substances can be incorporated if desired into the shape retention layer in order to improve ink fixability or for other purposes. Examples of the organic compound include hydrocarbon polymers, vinyl or styrene polymers, acetal polymers, butyral polymers, acrylic polymers, polyester polymers, urethane polymers, cellulosic polymers, and various waxes.

It is especially preferred to incorporate a cellulosic polymer such as ethyl cellulose from the standpoints of improving ink fixability in thermal transfer printing, improving the strength of the printing sheet, etc. The use amount of the organic compound is generally from 5 to 200 parts by weight, preferably from 10 to 100 parts by weight, per 100 parts by weight of the sum of the MQ resin and the silicone rubber. However, the use amount thereof is not limited thereto.

A melting-point depressant for silica can be further incorporated. This melting-point depressant may be an appropriate substance which is capable of lowering the melting point of silica. Examples thereof include alkali metals such as potassium, sodium, and lithium. Although such an alkali metal can be incorporated, for example, in the form of a powder of the metal, it is preferred in the present invention that the melting-point depressant be dispersed as evenly as possible throughout the shape retention layer. From this standpoint, finer particles are advantageous. It is therefore possible to incorporate an alkali metal as a compound thereof which is easily available as fine particles. The kind of this compound is not particularly limited and an appropriate one may be used, such as, e.g., hydroxide or carbonate.

The use amount of the melting-point depressant for silica can be suitably determined according to the strength of the burned sheet to be obtained, etc. The melting-point depressant for silica functions in the following manner. When a printed sheet is burned at about 400° C. or higher as stated above, the MQ resin is deprived of its organic groups, such as silicon-bonded methyl groups, and thus changes into fine silica particles. These silica particles undergo sintering, during which the melting-point depressant serves to lower the melting point of the silica to thereby enhance the sinter strength of the resulting sheet.

If a melting-point depressant for silica is not incorporated, the resultant sintered sheet has a surface hardness in terms of pencil hardness of about 4 H, indicating that the sinter has poor strength and the surface thereof is readily broken by mechanical impacts. Namely, the ink information on this sintered sheet is apt to be burned out. In contrast, by incorporating KOH into a printing sheet in an amount of 4,000 ppm, the surface hardness of the sheet can be heightened to 9 H or higher, which corresponds to that of ceramic labels.

Consequently, a melting-point depressant for silica can accomplish the purpose of the incorporation thereof when incorporated in an amount as small as at least 0.01 ppm of the printing sheet as determined by the water extraction method. The incorporation amount thereof is regulated according to the strength of the burned sheet to be obtained, etc. The strength of the burned sheet is influenced also by the diameter of the aforementioned fine silica particles formed from the MQ resin. The particle diameter thereof is theoretically thought to be about 1 nm. As long as such fine particles are contained even in an amount as small as below 1% by weight based on the printing sheet, a burned sheet can be obtained as a strong sinter even when burning is conducted at a temperature of 500° C. or lower.

From the standpoints of the strength of the burned sheet to be obtained and the formability of the printing sheet, etc. in view of the diameter of the fine silica particles and the attainment of a reduction in burning temperature, the incorporation amount of the melting-point depressant for silica is preferably 0.1 ppm or larger, more preferably from 50 to 10,000 ppm, most preferably from 100 to 5,000 ppm, per 100 parts by weight of the MQ resin.

The printing sheet of the present invention is preferably used in the following application. The printing sheet is provisionally bonded to an adherend either as it is or as a printed sheet obtained by imparting information thereto. This printing sheet or printed sheet is heated to thereby tightly bond the same to the adherend. In conducting this heat treatment, a method can be employed that a material to be fixed (e.g., aluminum plate) is placed (adhered) on the printing sheet, the laminate is heated, and the heated product is fixed to an adherend.

There are cases where the printing sheet or printed sheet of the present invention can be provisionally bonded to an adherend by means of its own pressure-sensitive adhesive properties. However, a pressure-sensitive adhesive layer may be formed on the sheet for the purpose of improving suitability for provisional bonding or for other purposes. The pressure-sensitive adhesive layer can be formed in an appropriate stage before the printing sheet or printed sheet is provisionally bonded to an adherend and heated. Namely, it may be formed before information is imparted to the printing sheet to obtain a printed sheet, or may be formed after a printed sheet has been thus obtained.

As a material for forming a pressure-sensitive adhesive layer, an appropriate pressure-sensitive adhesive material can be used, such as a pressure-sensitive adhesive based on a rubber, acrylic, silicone, or vinyl alkyl ether. For forming the pressure-sensitive adhesive layer, an appropriate method employed in the formation of pressure-sensitive adhesive tapes and the like can be used. Examples thereof include a method in which a pressure-sensitive adhesive material is applied to the printing sheet or printed sheet by an appropriate coating technique using, e.g., a doctor blade or gravure roll coater and a method in which a pressure-sensitive adhesive layer is formed on a separator by such a coating technique and the adhesive layer is transferred to the printing sheet or printed sheet.

Figure 4:
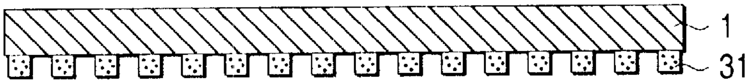
FIG. 4 is a sectional view of still another embodiment of the printing sheet of the present invention.

It is also possible to form a pressure-sensitive adhesive layer made up of dots of a pressure-sensitive adhesive, for the purpose of enabling decomposition gases resulting from heating to volatilize smoothly or for other purposes. In this case, a more preferred constitution is one in which the printing sheet is porous as described above. In FIG. 4 is shown a printing sheet 1 having a pressure-sensitive adhesive layer 31 made up of pressure-sensitive adhesive dots. Such a pressure-sensitive adhesive layer can be formed by a coating technique such as, e.g., the rotary screen process.

Although the thickness of the pressure-sensitive adhesive layer to be formed can be determined according to the intended use thereof, etc., it is generally from 1 to 500 $\mu$m, preferably from 5 to 200$\mu$m. It is preferred to cover the thus-formed pressure-sensitive adhesive layer with a separator or the like in order to prevent fouling, etc. until the adhesive layer is provisionally bonded to an adherend. For provisionally bonding the printing sheet or printed sheet to an adherend, use can be made of a method in which the sheet is automatically applied by a robot or the like.

A printed sheet can be obtained by an appropriate method such as, e.g., a method in which ink information or engraved information comprising either holes or projections and recesses is imparted to the printing sheet or a method in which an appropriate shape is punched out of the printing sheet. It is also possible to form a printed sheet having a combination of the aforementioned information elements or having a combination of different kinds of information formed by any of other various methods.

The ink information can be imparted by handwriting or by an appropriate printing technique such as coating through a patterned mask, transfer of a pattern formed on a transfer paper, or printing with a printer. Preferred of these is printing with a printer, in particular, a thermal transfer printer, because this printing technique is advantageous, for example, that any desired ink information can be efficiently imparted highly precisely according to circumstances.

An appropriate ink can be used, such as, e.g., an ink containing a colorant such as a pigment, in particular, a heat-resistant colorant such as an inorganic pigment. The ink may contain a glass frit or the like so as to have improved fixability after heat treatment or for other purposes. An ink sheet such as a printing ribbon for use in thermal transfer printers can be obtained, for example, by adding a binder such as a wax or polymer to such an ink and causing a supporting substrate comprising a film, a fabric, or the like to hold the resultant ink composition. Consequently, a known ink or an ink sheet containing the same can be used in thermal transfer printing or the like.

The ink information to be imparted is not particularly limited, and appropriate ink information may be imparted, such as, e.g., characters, a design pattern, or a bar code pattern. In the case where an identification label, e.g., a management label, is formed or in similar cases, it is preferred to impart ink information so that a satisfactory contrast or a satisfactory difference in color tone is formed between the printing sheet and the ink information after heat treatment.

The step of imparting ink information or a shape to the printing sheet may be conducted either before or after the printing sheet is provisionally bonded to an adherend. In the case where a printer is used for imparting ink information, the generally employed method is to prepare beforehand a printed sheet having ink information and provisionally bond the same to an adherend.

The heat treatment of the printing sheet or printed sheet which has been provisionally bonded to an adherend can be conducted under suitable conditions according to the heat resistance of the adherend, etc. The heating temperature is generally 800° C. or lower, preferably from 200 to 650° C., more preferably from 250 to 550° C. During the heat treatment, the organic components including those contained in the pressure-sensitive adhesive layer disappear and the MQ resin and silicone rubber contained in the printing sheet cure while uniting with the ink information. As a result, a burned sheet tightly bonded to the adherend is formed The printing sheet or printed sheet of the present invention can be advantageously used in various applications such as, e.g., the printing or coloring of various articles including pottery, glassware, ceramics, metallic products, and enameled products and the impartation of identification information or identification marks comprising bar codes to such articles.

In particular, the printing or printed sheet can be advantageously used in forming management labels or the like which are utilizable, e.g., from the production of Braun tubes to the reclamation of reworkable parts from recycled Braun tubes, because the burned sheet obtained from the printing or printed sheet has such an excellent chemical resistance that it withstands immersion in hot nitric acid and satisfactorily retains the ink information. The adherend may have any shape such as, e.g., a flat shape or a curved shape as of containers.

The present invention will be explained below in more detail by reference to the following Examples, but the invention should not be construed as being limited thereto.

EXAMPLE 1

With toluene were evenly mixed 130 parts by weight (hereinafter all parts are by weight) of an MQ resin, 30 parts of a silicone rubber (both manufactured by Shin-Etsu Chemical Co., Ltd.), 80 parts of potassium titanate, and 60 parts of ethyl cellulose. The resulting dispersion was applied on a PET film having a thickness of 75 μm with a doctor blade. The coating was dried to form a shape retention layer having a thickness of 65 μm. Thus, a printing sheet was obtained.

On the other hand, a toluene solution containing 100 parts of poly(butyl acrylate) having a weight-average molecular weight of about 1,000,000 was applied with a doctor blade on a separator which was a 70 μm-thick glassine paper treated with a silicone release agent. The coating was dried to form a pressure-sensitive adhesive layer having a thickness of 20 μm. This adhesive layer supported on the separator was applied to the shape retention layer, and the PET film was peeled off to obtain a printing sheet having a pressure-sensitive adhesive layer.

Subsequently, ink information comprising a bar code was imparted to the printing sheet using a thermal transfer printer and a commercial ink ribbon holding a wax-based ink containing a black metal oxide pigment and a bismuth glass. Thus, a printed sheet was obtained.

EXAMPLE 2

A printing sheet and a printed sheet were obtained in the same manner as in Example 1, except that aluminum borate was used in place of the potassium titanate.

COMPARATIVE EXAMPLE 1

A printing sheet and a printed sheet were obtained in the same manner as in Example 1, except that the silicone rubber was replaced with the same MQ resin as in Example 1.

COMPARATIVE EXAMPLE 2

A printing sheet and a printed sheet were obtained in the same manner as in Example 1, except that the MQ resin was replaced with the same silicone rubber as in Example 1.

EVALUATION TESTS

The separator was peeled from each of the printed sheets obtained in the Examples and Comparative Examples. Each printed sheet was provisionally bonded to a glass plate through the pressure-sensitive adhesive layer and then heated at 470° C. for 30 minutes (in air). As a result, glass plates were obtained which each had, tightly bonded thereto, a burned sheet having clear ink information comprising a black bar code on a white background. These glass plates were subjected to the following tests. By the heat treatment, the ethyl cellulose contained in each printing sheet and the other organic components including those contained in the pressure-sensitive adhesive layer were burned out. Each burned sheet remaining after the heat treatment was a cured sheet formed from the MQ resin and/or the silicone rubber.

Sinter Strength

The surface of each burned sheet was rubbed with a cotton cloth to examine the ink information fixing strength and the glass plate bonding strength of the burned sheet. These properties were evaluated based on the following criteria.

Good: Burned sheet wholly remained adherent and ink information retained the same readability as before the test.

Poor: Burned sheet rubbed off at least partly and ink information became unreadable.

Reflectance

Reflectance of the white background in each burned sheet was measured with respect to light having a wavelength range of from 400 to 800 nm.

Chemical Resistance

Each burned sheet was immersed together with the glass plate in 15% nitric acid solution at 80° C. for 2 minutes, subsequently taken out thereof, and then evaluated by the same method as in the sinter strength test given above.

The results obtained are shown in Table 1.

TABLE 1

| | Example 1 | Example 2 | Comparative Example 1 | Comparative Example 2 |
|---|---|---|---|---|
| Sinter strength | Good | Good | Good | Poor |
| Reflectance (%) | 80 | 50 | 80 | 80 |
| Chemical resistance | Good | Good | Poor*[1] | Poor*[2] |

*[1]Ink information disappeared because a surface layer of the burned sheet rubbed off.
*[2]Ink information became blurred.

EXAMPLE 3

With toluene were evenly mixed 130 parts by weight (hereinafter all parts are by weight) of an MQ resin, 30 parts of a silicone rubber (both manufactured by Shin-Etsu Chemical Co., Ltd.), 0.4 parts of potassium hydroxide, 80 parts of potassium titanate, and 60 parts of ethyl cellulose. The resultant dispersion was applied on a polyester film having a thickness of 75 $\mu$m with a doctor blade. The coating was dried to form a shape retention layer having a thickness of 65 $\mu$m. Thus, a printing sheet was obtained.

On the other hand, a toluene solution containing 100 parts of poly(butyl acrylate) having a weight-average molecular weight of about 1,000,000 was applied with a doctor blade on a separator which was a 70 $\mu$m-thick glassine paper treated with a silicone release agent. The coating was dried to form a pressure-sensitive adhesive layer having a thickness of 20 $\mu$m. This adhesive layer supported on the separator was applied to the shape retention layer, and the polyester film was peeled off to obtain a printing sheet having a pressure-sensitive adhesive layer.

Subsequently, ink information comprising a bar code was imparted to the printing sheet using a thermal transfer printer and a commercial ink ribbon holding a wax-based ink containing a black metal oxide pigment and a bismuth glass. Thus, a printed sheet was obtained.

EXAMPLE 4

A printing sheet and a printed sheet were obtained in the same manner as in Example 3, except that aluminum borate was used in place of the potassium titanate.

COMPARATIVE EXAMPLE 3

A printing sheet and a printed sheet were obtained in the same manner as in Example 3, except that the potassium hydroxide was omitted.

COMPARATIVE EXAMPLE 4

A printing sheet and a printed sheet were obtained in the same manner as in Example 3, except that the silicone rubber was replaced with the same MQ resin as in Example 3.

COMPARATIVE EXAMPLE 5

A printing sheet and a printed sheet were obtained in the same manner as in Example 3, except that the MQ resin was replaced with the same silicone rubber as in Example 3.

Evaluation Tests

The separator was peeled from each of the printed sheets obtained in the above Examples and Comparative Examples. Each printed sheet was provisionally bonded to a glass plate through the pressure-sensitive adhesive layer and then heated at 470° C. for 30 minutes (in air). As a result, glass plates were obtained which each had, tightly bonded thereto, a burned sheet having clear ink information comprising a black bar code on a white background. These glass plates were subjected to the following tests. By the heat treatment, the ethyl cellulose contained in each printing sheet and the other organic components including those contained in the pressure-sensitive adhesive layer were burned out. Each burned sheet remaining after the heat treatment was a cured sheet comprising silica formed from the MQ resin and/or the silicone rubber.

Pencil Hardness

The pencil hardness of the surface of each burned sheet was measured in accordance with JIS K 5400.

Sinter Strength

The surface of each burned sheet was rubbed with a cotton cloth to examine the ink information fixing strength and the glass plate bonding strength of the burned sheet. These properties were evaluated based on the following criteria.

Good: Burned sheet wholly remained adherent and the ink information retained the same readability as before the test.

Poor: Burned sheet rubbed off at least partly and the ink information became unreadable.

Reflectance

The reflectance of the white background in each burned sheet was measured with respect to light having a wavelength range of from 400 to 800 nm.

Chemical Resistance

Each burned sheet was immersed together with the glass plate in 15% nitric acid solution at 80° C. for 2 minutes, subsequently taken out thereof, and then evaluated by the same method as in the sinter strength test given above.

The results obtained are shown in Table 2 below.

TABLE 2

| | Example 3 | Example 4 | Comparative Example 3 | Comparative Example 4 | Comparative Example 5 |
|---|---|---|---|---|---|
| Pencil hardness | ≧9 H | ≧9 H | 4 H | ≧9 H | 3 H |
| Sinter strength | Good | Good | Good | Good | Poor |
| Reflectance (%) | 80 | 50 | 80 | 80 | 80 |
| Chemical resistance | Good | Good | Scratchy | Disappeared | Blurred |

Scratchy: Pattern partly disappeared.

Blurred: Pattern became blurred.

While the invention has been described in detail and with reference to specific embodiments thereof, it will be apparent to one skilled in the art that various changes and modifications can be made therein without departing from the spirit and scope thereof.

What is claimed is:

1. A printing sheet comprising a sheet comprising a mixture comprising inorganic particles, an MQ resin, a silicone rubber and an organic compound.

2. The printing sheet of claim 1, wherein the inorganic particles are acicular crystals.

3. The printing sheet of claim 1 or 2, wherein the mixture further contains at least one of a cellulosic polymer and a melting-point depressant for silica.

4. The printing sheet of claim 1, which has a pressure-sensitive adhesive layer on one side thereof.

5. The printing sheet of claim 1, wherein said organic compound is selected from the group consisting of hydrocarbon polymers, vinyl or styrene polymers, acetal polymers, butyral polymers, acrylic polymers, polyester polymers, urethane polymers, cellulosic polymers and waxes.

6. The printing sheet of claim 1, wherein the MQ resin comprises monofunctional units M represented by formula $R_3SiO$— and tetrafunctional units Q represented by formula $Si(O—)_4$, wherein each R is independently an organic group, an olefin group, or a hydrolyzable group.

7. The printing sheet of claim 6, wherein said organic group as R is an aliphatic or aromatic hydrocarbon group.

8. The printing sheet of claim 6, wherein said olefin group is vinyl.

9. The printing sheet of claim 6, wherein said hydrolyzable group is hydroxyl.

10. A printed sheet obtained by imparting ink information to the printing sheet of claim 1 by thermal transfer printing.

* * * * *